United States Patent [19]

Morse et al.

[11] Patent Number: 4,800,712
[45] Date of Patent: Jan. 31, 1989

[54] GRASS CATCHER MOUNTING SYSTEM

[75] Inventors: Richard R. Morse, Galesburg; Carl E. Seyerle, Abington, both of Ill.

[73] Assignee: Outboard Marine Corporation, Waukegan, Ill.

[21] Appl. No.: 643,754

[22] Filed: Aug. 23, 1984

Related U.S. Application Data

[63] Continuation of Ser. No. 582,136, Feb. 23, 1984, abandoned, which is a continuation of Ser. No. 405,292, Aug. 4, 1982, abandoned.

[51] Int. Cl.$^4$ ............................................. A01D 34/70
[52] U.S. Cl. ............................................ 56/202; 56/16.6
[58] Field of Search ..................... 56/202, 320.2, 16.6

[56] References Cited

U.S. PATENT DOCUMENTS

| | | | |
|---|---|---|---|
| 3,872,656 | 3/1975 | Dahl | 56/320.2 |
| 3,921,373 | 11/1975 | Rubin | 56/202 |
| 3,962,852 | 6/1976 | Boyer | 56/202 |
| 4,043,102 | 8/1977 | Uhlinger et al. | 56/202 |
| 4,203,276 | 5/1980 | Plamper | 56/202 |
| 4,214,424 | 7/1980 | Gobin | 56/202 |
| 4,238,918 | 12/1980 | Sarahashi et al. | 56/320.2 |
| 4,413,467 | 11/1983 | Arizpe | 56/202 |

Primary Examiner—John Weiss
Attorney, Agent, or Firm—Michael, Best & Friedrich

[57] ABSTRACT

A lawn mower comprising a housing including a discharge chute, a door mounted on the housing for pivotal movement between a closed position preventing discharge from the chute of grass clippings and an open position permitting discharge from the chute of grass clippings, a spring biasing the door to the closed position, a grass clippings catcher including a relatively rigid frame defining, at least in part, a mouth, and a collector communicating with the mouth, and structures on the housing, on the door, and on the catcher for removably supporting the frame on the housing in a mounted position relative to the chute so as to enable receipt of grass clippings from the chute, for displacing the door to the open position in response to movement of the frame to the mounted position, for retaining the door in the open position during continued location of the frame in the mounted position, for releasably holding the frame in the mounted position, and for permitting displacement of the door to the closed position in response to movement of the frame from the mounted position.

6 Claims, 1 Drawing Sheet

U.S. Patent  Jan. 31, 1989  4,800,712
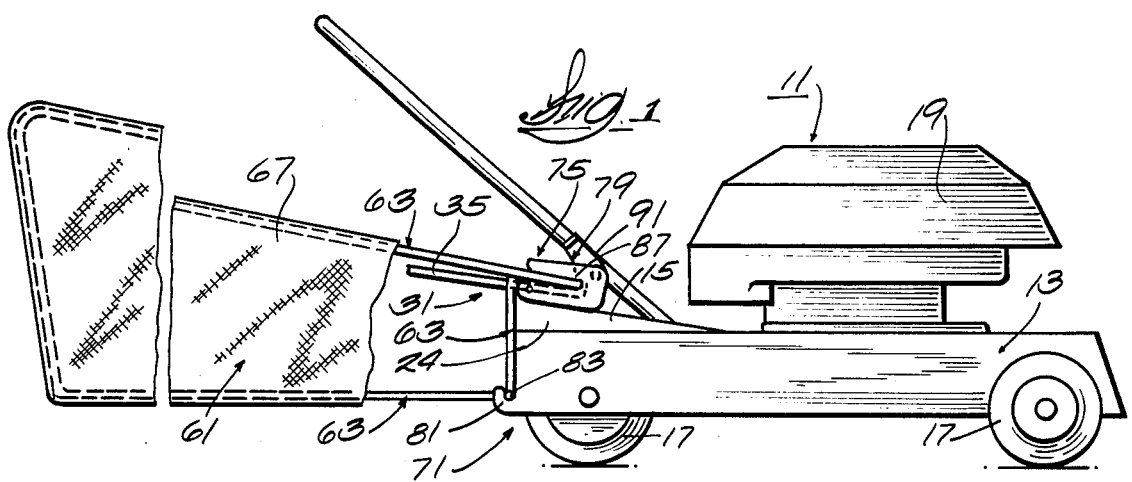
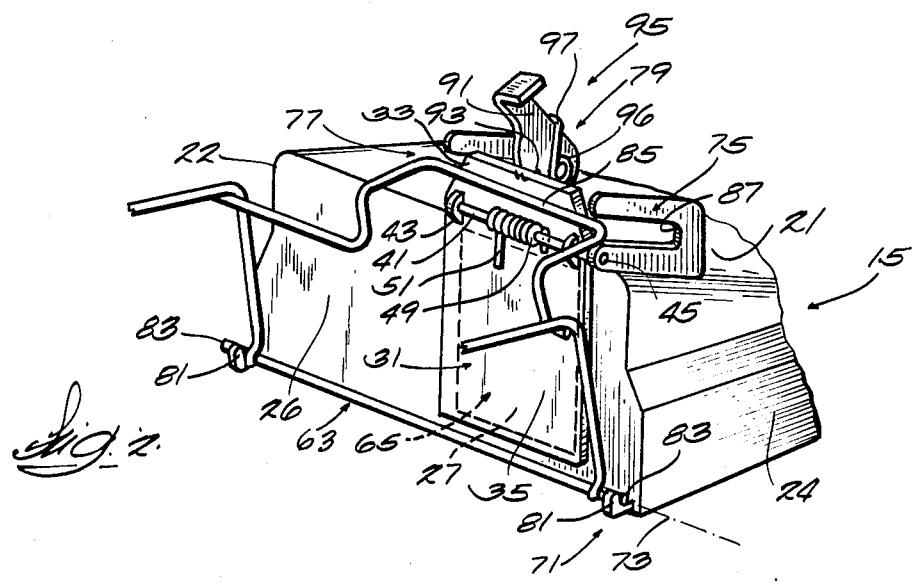
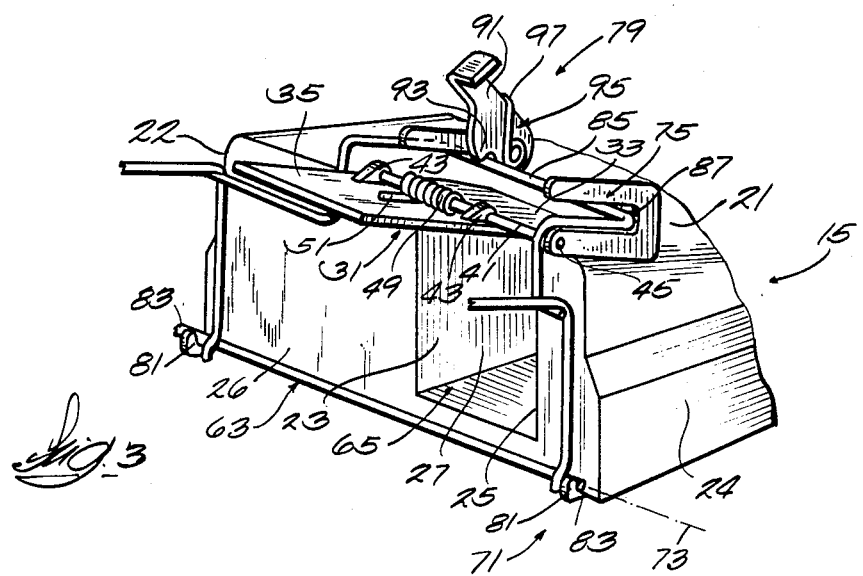

GRASS CATCHER MOUNTING SYSTEM

This is a continuation of application Ser. No. 582,136 abondoned 9/28/84, filed 2/23/84 which in turn is a continuation of U.S. Ser. No. 405,292, filed 8/04/82, abandoned 4/02/84.

BACKGROUND OF THE INVENTION

The invention relates generally to lawn mowers and, more particularly, for grass catchers for lawn mowers. Still more particularly, the invention relates to lawn mowers including a discharge chute and a door for closing the discharge end of the chute when the grass catcher is disassembled from the discharge chute.

Attention is directed to U.S. Pat. No. 3,726,069, issued Apr. 3, 1973, wherein there is disclosed a deflector mounted on the end of a side discharge chute to downwardly deflect grass clippings discharged from the chute when the collector bag is disassembled from the discharge chute. When assembling the collector bag to the discharge chute, the operator first displaces the deflector to an upwardly extending position, and then connects the connector bag to the discharge chute with the deflector located exteriorly of the collector bag.

Attention is also directed to U.S. Pat. No. 3,872,656 issued Mar. 25, 1975 in which a chute door otherwise movable to a chute closing position is located to the side of a collector bag when the bag is attached to the discharge chute.

Attention is also directed to U.S. Pat. No. 3,423,918 issued Jan. 28, 1969, and to U.S. Pat. No. 3,636,868 issued Jan. 25, 1972.

SUMMARY OF THE INVENTION

The invention provides a lawn mower comprising a housing including a discharge chute, a door mounted on the housing for pivotal movement between a closed position preventing discharge from the chute of grass clippings and an open position permitting discharge from the chute of grass clippings, means biasing the door to the closed position, a grass clippings catcher including a relatively rigid frame defining, at least in part, a mouth, and a collector communicating with the mouth, and means on the housing, on the door, and on the catcher for removably supporting the frame on the housing in a mounted position relatve to the chute so as to enable receipt of grass clippings from the chute, for displacing the door to the open position in response to movement of the frame to the mounted position, for retaining the door in the closed position during continued location of the frame in the mounted position, for releasably holding the frame in the mounted position on the housing, and for permitting displacement of the door to the open position in response to movement of the frame from the mounted position.

In one embodiment of the invention, the means on the housing, on the door, and on the catcher, includes means on the frame and on the housing for removably supporting the frame on the housing for pivotal movement of the frame relative to the mounted position and about an axis located adjacent to the bottom of the discharge chute, inter-engaging means on the frame and on the housing for guiding pivotal movement of the frame toward and away from the mounted position, inter-engaging means on the frame and on the door for displacing the door from the closed position to the open position in response to movement of the frame to the mounted position, and inter-engaging means on the frame and on the housing for releasable engagement therebetween to hold the frame in the mounted position.

The invention also provides a lawn mower comprising a housing comprising a discharge chute including an upper wall and a pair of laterally spaced side walls which depend from the upper wall and which, together with the upper wall, define a discharge end, a pair of laterally spaced cradles extending from the housing adjacent the bottom of the discharge chute, and adjacent the discharge end thereof, and a pair of laterally spaced slots located adjacent the chute upper wall and adjacent the discharge end, a door including upper and lower portions, which door is mounted intermediate the upper and lower portions to the discharge chute adjacent the discharge end for pivotal movement between a closed position preventing discharge from the chute of grass clippings and an open position permitting discharge from the chute of grass clippings, means biasing the door to the closed position, a grass clipping catcher comprising a relatively rigid frame including a pair of laterally spaced lugs extending for receipt thereof in the cradles so as to support the frame and so as to enable pivotal movement of the frame relative to the chute discharge and to a mounted position on the discharge chute, which mounted position enables discharge of grass clippings from the chute to the catcher, and a transverse frame member receivable into the slots during movement of the frame to the mounted position so as to prevent removal of the lugs from the cradles and to guide pivotal movement of the frame to the mounted position, which transverse frame member is also engagable with the upper portion of the door to pivotally displace the lower portion thereof from the discharge chute in response to pivotal movement of the frame to the mounted position, a latch member including a hook portion, which latch member is pivotally mounted on the chute for movement between an engaged position wherein the hook portion engages the transverse frame member to prevent pivotal movement of the frame from the mounted position and a disengaged position wherein the hook portion is clear of the transverse frame member, and means for yieldably biasing the latch member to the engaged position.

Other features and advantages of the embodiments of the invention will become known by reference to the following general description, claims and appended drawings.

IN THE DRAWINGS

FIG. 1 is a side elevational view, partially broken away, of a lawn mower incorporating various of the features of the invention.

FIG. 2 is an enlarged rear perspective view of various of the components of the lawn mower shown in FIG. 1.

FIG. 3 is a view similar to FIG. 2 except that various of the components are shown in another location.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 of the drawings is a rotary lawn mower 11 including a housing 13 which is suitably supported for movement over the ground by a plurality of wheels 17, and which includes a prime mover 19 driving a cutter blade (not shown) located within the housing 13.

The lawn mower includes a discharge chute 15 which is formed within the rear deck structure of the housing 13. More particularly, the rear deck structure comprises an upper or top wall 21, together with laterally spaced side walls 22 and 24, and a partial rear wall 26 which closes the back of the rear deck structure except for the opening of the discharge chute 15. In this regard, the top wall 21 also serves as the top wall of the discharge chute 15. In addition, the chute includes a pair of laterally spaced side walls 23 and 25 which depend from the top wall 21 and which are located inwardly of the rear deck structure side walls 22 and 24, and which, together with the top wall 21, define a discharge chute opening or end 27.

Supported on the housing 13, adjacent the discharge end 27 of the chute 15, is a door 31 which is movable between an open position permitting discharge from the chute 15 of grass clippings and a closed position preventing discharge of clippings from the chute 15. While other constructions can be employed, in the illustrated construction, the door 31 is pivotally mounted intermediate the top and bottom thereof and includes an upper portion 33 above the pivotal mounting and a lower portion 35 below the pivotal mounting, which lower portion 35 is located in closing relation to the discharge end 27 of the chute 15 when the door 31 is in the closed position and extends outwardly from the chute top wall 21 when the door 31 is in the open position.

While other arrangements can be employed, in the disclosed construction, the door 31 is pivotally mounted by a rod 41 which is located adjacent to the chute top wall 21 at the discharge end 27 thereof, which passes through a laterally spaced pair of ears 43 on the door 31, and which extends between mountings 45 (one shown) on the chute top wall 21.

Means are also provided for biasing the door 31 to the closed position. While other arrangement can be employed, in the disclosed construction, such means comprises a helical spring 49 which encircles the rod 41 and which has one end 51 bearing against the door 31 and a second end (not shown) bearing against the chute top wall 21.

The lawn mower 11 also includes a grass catcher 61 including a frame 63 which, in part, defines a mouth or opening 65 for the grass catcher, and a bag or collector 67 which extends from the mouth 65 for receipt therein of grass clippings. Any suitable bag or collector 67 can be employed.

In addition, the lawn mower 11 includes means on the housing 13, on the door 31, and on the catcher 61 for removably supporting the frame 63 on the housing 13 in a mounted position relative to the discharge chute 15 (shown in FIG. 3) enabling receipt of grass clippings from the chute 15, for displacing the door 31 to the open position in response to movement of the frame 63 to the mounted position, for retaining the door 31 in the open position during continued location of the frame 63 in the mounted position, for releasably holding the frame 63 in the mounted position relative to the chute 15, and for permitting displacement of the door 31 to the closed position under the action of the spring 49 in response to movement of the frame 63 from the mounted position relative to the chute 15.

While other constructions can be employed, the last mentioned means comprises support means 71 on the frame 63 and on the housing 13 for removably supporting the frame 63 for pivotal movement thereof relative to the mounted position and about an axis 73 located adjacent to the bottom or lower end of the discharge chute end 27, inter-engaging guide means 75 on the frame 63 and on the housing 13 for guiding pivotal movement of the frame 63 toward and away from the mounted position during pivotal movement of the frame 63 relative to and adjacent to the discharge chute end 27, inter-engaging means 77 on the frame 63 and on the door 31 for displacing the door 31 from the closed position to the open position in response to movement of the frame 63 to the mounted position, and inter-engaging latch means 79 on the frame 63 and on the housing 13 for releasable engagement therebetween to releasably hold the frame 63 in the mounted position.

More particularly, while other constructions could be employed, the support means 71 comprises a pair of laterally spaced cradles 81 extending from adjacent the bottom of the side walls 22 and 24 adjacent the chute discharge end 27, and a pair of laterally spaced lugs 83 extending from the frame 63 for receipt in the cradles 81 so as to support the frame 63 and so as to enable pivotal movement of the frame 63 relative to the mounted position on the discharge chute 15.

Still more particularly, while other constructions can be employed, the inter-engaging guide means 75 comprises a transverse member 85 forming a part of the frame 63, and a pair of laterally spaced slots 87 located adjacent the chute upper or top wall 21 for receipt of the transverse frame member 85 incident to pivotal movement of the frame 63 toward the mounted position when the lugs 83 are supported in the cradles 81. Furthermore, during pivotal frame movement adjacent to the mounted position, engagement of the transverse member 85 in the slots 87 prevents displacement of the lugs 83 from the cradles 81.

Still more particularly, while other constructions can be employed, the door displacing means 77 comprises the upper portion 33 of the pivotally mounted door 31 and the transverse frame member 85 which is engageable with the door upper portion 33 to pivotally displace the lower portion 35 of the door 31 away from the discharge chute end 27 and through the mouth 65 into the collector 67 of the catcher 61 in response to frame movement to the mounted position.

Still more particularly, while other constructions can be employed, the latch means 79 comprises the transverse frame 85 member, together with a latch member 91 including a hook portion 93, which latch member 91 is mounted for pivotal movement on the top wall 21 between an engaged position wherein the hook portion 93 is engaged with the transverse frame member 85 to prevent pivotal movement of the frame 63 away from the mounted position, and a disengaged position wherein the hook portion 93 is clear of the transverse frame member 85, and means for yieldably biasing the latch member 91 to the engaged position.

While other constructions can be employed, in the disclosed construction, the means for yieldably biasing the latch member 91 comprises a spring 95 having a coil 96 encircling the pivotal mounting of the latch member 91 and having one end 97 engaged against an edge of the latch member 91 and another end (not shown) bearing against the top wall 21 so as to urge the latch member 21 in the counter-clockwise direction as shown in FIG. 2 and 3 and into engagement with the transverse frame member 85 to prevent withdrawal of the catcher frame 63 from the mounted position.

In operation, when it is desired to attach the grass catcher 61 to the housing 13 adjacent the discharge chute 15, the lugs 83 are initially located in the cradles 81, the catcher frame 63 is then pivoted in the clockwise direction as shown in FIGS. 2 and 3 so as to engage the transverse frame member 85 with the upper portion 33 of the door 31 and so as to effect entry of the transverse frame member 85 into the slots 87, thereby preventing displacement of the lugs 83 from the supporting cradles 81. As the transverse frame member 85 moves inwardly of the slots 87, the door 31 is pivoted against the action of the spring 49 in the clockwise direction until the door lower portion 35 extends outwardly from the top wall 21 and into the catcher 61. At the same time, the transverse frame member 85 engages the latch member 91 and cams the latch member against the action of the spring so as to permit arrival of the frame 63 in the mounted position. When the catcher frame 63 is in the mounted position, the latch member 91 returns to permit the hook portion 93 to into engagement with the transverse frame member 85 to prohibit pivotal movement of the catcher frame 63 about the axis 73 of the cradles 81 and thereby to retain the grass catcher 61 in assembled, mounted relation to the discharge chute 15, with the door 31 in the open position, so long as the latch member 91 is not manually displaced from the engaged position.

When it is desired to remove the grass catcher 61 from the discharge chute 15, the latch member 91 is rotated in the clockwise direction, against the action of the spring 95, and away from the full line position shown in FIG. 2, thereby disengaging the hook portion 93 from the transverse frame member 85. When the transverse frame member 85 is disengaged from the latch member 91, the catcher 61 can be pivoted in the counter-clockwise direction about the cradle axis 73 until the transverse frame member 85 withdraws from the slots 87. Such outward movement of the catcher frame 63 from the mounted position permits the door 31 to move back to the closed position under the action of the biasing spring 49. When the transverse frame member 85 exits from the slots 87, the catcher frame 63 may be manipulated to remove the ears or lugs 83 from the cradles 81, thereby permitting manual transport of the grass catcher 61 from the lawn mower 11.

Various of the features of the invention are set forth in the following claims.

We claim:

1. A lawn mower comprising a housing including a discharge chute having a bottom portion, a door mounted on said housing for pivotal movement between a closed position preventing discharge from said chute of grass clippings and an open position permitting discharge from said chute of grass clippings, means biasing said door to said closed position, a grass clippings catcher including a relatively rigid frame defining, at least in part, a mouth having an upper part, and a collector communicating with said mouth, said frame including a supporting part, and a second part adjacent said upper part of said mouth, upwardly open cradle means on said housing adjacent said bottom portion of said discharge chute for receiving said supporting part of said frame so as to removably support said frame in a position located adjacent said chute ad so as to afford pivotal movement of said frame about an axis located adjacent the bottom poriton of said discharge chute and relative to said discharge chute and to a mounted position with said mouth in communication with said discharge chute whereby to enable receipt of grass clippings from said chute, said cradle means including an upwardly facing support surface and a vertically extending surface spaced from said housing, interengaging means on said frame and on said door for displacing said door to said open position in response to movement of said frame to said mounted position and for retaining said door in said open position during continued location of said frame in said mounted position, interengaging means on said frame and on said housing for releasable engagement therebetween to hold said frame in said mounted position on said housing, and means for preventing displacement of said supporting part from said cradle means comprising said supporting part and said second part of said frame, said vertical surface and said upwardly facing surface of said cradle means, and a downwardly facing surface on said housing, said surface on said housing being spaced from said upwardly facing surface at a dimension locating said downwardly facing surface adjacent to the path of said second part of said frame during frame movement to, and when said frame is located in, said mounted position so as to permit movement of said frame to said mounted position and to prevent displacement of said supporting part from said cradle means when said frame is moved to, and when said frame is located in, said mounted position.

2. A lawn mower in accordance with claim 1 wherein said supporting part comprises a pair of laterally spaced lugs extending from said frame for receipt of said lugs in said cradle means so as to support said frame and so as to enable pivotal movement of said frame to said mounted position on said housing.

3. A lawn mower in accordance with claim 1 wherein said discharge chute includes an upper wall, and wherein said interengaging means on said frame and on said housing for releasably preventing displacement of said supporting part from said cradle means comprises a transverse member forming said second part of said frame, and a pair of laterally spaced slots located adjacent said upper wall of said discharge chute for receipt of said transverse frame member incident to pivotal frame movement toward said mounted position.

4. A lawn mower in accordance with claim 1 wherein said door has upper and lower portions, wherein said door is pivoted to said housing intermediate said upper and lower portions, and wherein said interengaging means on said frame and on said door for displacing said door to said open position in response to pivotal movement of said frame to said mounted position comprises a transverse member forming a part of said frame and engageable with said upper portion of said door to pivotally displace said lower portion of said door away from said discharge chute in response to pivotal movement of said frame to said mounted position.

5. A lawn mower in accordance with claim 1 wherein said interengaging means on said frame and on said door for releasable engagement therebetween to hold said frame in said mounted position comprises a transverse member forming a part of said frame, a latch member including a hook portion, said latch member being mounted on said housing for pivotal movement between an engaged position wherein said hook portion is engaged with said transverse frame member to prevent pivotal movement of said frame away from said mounted position and a disengaged position herein said hook portion is clear of said transverse frame member, and means for yieldably biasing said latch member to said engaged position.

6. A lawn mower comprising a housing comprising a discharge chute including an upper wall and a pair of laterally spaced side walls which depend from said upper wall and which, together with said upper wall, define a discharge end having a bottom portion, a pair of laterally spaced cradles including upwardly directed openings defined by upper surfaces extending from said housing adjacent said bottom portion of said discharge chute and vertically extending surfaces spaced from said discharge end, said housing also comprising a pair of laterally spaced slots located adjacent said upper wall and adjacent said discharge end, said slots being defined, in part, by a downwardly facing surface, a door including upper and lower portions, said door being mounted intermediate said upper and lower portions on said housing adjacent said discharge chute end for pivotal movement between a closed position preventing discharge from said chute of grass clippings and an open position permitting discharge from said chute of grass clippings, means biasing said door to said closed position, a grass clipping catcher comprising a relatively rigid frame including a pair of laterally spaced lugs extending for receipt thereof in said cradle openings so as to support said frame on said cradle upper surfaces and so as to enable pivotal movement of said frame relative to said chute discharge end about a longitudinal axis adjacent the bottom of said discharge chute side walls and relative to a mounted position on said discharge chute, which mounted position enables discharge of grass clippings from said chute to said catcher, and a transverse frame member receivable into said slots during movement of said frame to said mounted position, said transverse member being spaced from said lugs so that said downwardly facing surface guides pivotal movement of said frame to said mounted position and prevents removal of said lugs from said cradles during frame movement to, and when said frame is located in, said mounted position, said transverse frame member also engaging said upper porrion of said door to pivotally displace said lower portion thereof from said discharge chute and into said catcher in response to pivotal movement o said frame to said mounted position, a latch member including a hook portion, said latch member being piovtally mounted on said housing for movement between an engaged position wherein said hook portion engages said transverse frame member to prevent pivotal movement of said frame from said mounted position and a disengaged position wherein said hook portion is clear of said transverse frame member, and means for yieldably biasing said latch member to the engaged position.

* * * * *